(12) United States Patent
Van Rensburg et al.

(10) Patent No.: US 7,885,660 B2
(45) Date of Patent: Feb. 8, 2011

(54) METHOD AND SYSTEM FOR PERFORMING A SOFT HANDOFF IN AN OFDMA WIRELESS NETWORK

(75) Inventors: Cornelius Van Rensburg, Dallas, TX (US); Yinong Ding, Plano, TX (US); Jiann-An Tsai, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1195 days.

(21) Appl. No.: 11/215,330

(22) Filed: Aug. 30, 2005

(65) Prior Publication Data

US 2007/0049279 A1   Mar. 1, 2007

(51) Int. Cl.
*H04Q 7/20* (2006.01)
(52) U.S. Cl. .............. 455/442; 370/345; 455/436; 455/437; 455/438; 455/439
(58) Field of Classification Search .......... 455/442, 455/436–441; 370/345
See application file for complete search history.

(56) References Cited

U.S. PATENT DOCUMENTS

| | | | |
|---|---|---|---|
| 6,038,450 A * | 3/2000 | Brink et al. ............. 455/442 |
| 6,198,928 B1 * | 3/2001 | Keurulainen et al. ........ 455/436 |
| 7,372,842 B2 * | 5/2008 | Kim et al. .................. 370/345 |
| 2002/0198000 A1 * | 12/2002 | Voyer ......................... 455/453 |
| 2003/0123559 A1 * | 7/2003 | Classon et al. ............. 375/260 |
| 2004/0081131 A1 * | 4/2004 | Walton et al. .............. 370/344 |
| 2005/0117547 A1 * | 6/2005 | Lu ............................. 370/335 |
| 2005/0288027 A1 * | 12/2005 | Cho et al. .................. 455/442 |
| 2008/0318577 A1 * | 12/2008 | Somasundaram et al. ... 455/436 |
| 2009/0247087 A1 * | 10/2009 | Chin et al. ............... 455/67.14 |

\* cited by examiner

*Primary Examiner*—Charles Shedrick

(57) ABSTRACT

A method for performing a soft handoff for a mobile station from a source base station to a target base station in an Orthogonal Frequency-Division Multiple Access (OFDMA) wireless network that is capable of communicating with a plurality of mobile stations in a coverage area of the OFDMA wireless network is provided. The method includes determining whether a relative delay between receipt of a source pilot signal from a source base station and receipt of a target pilot signal from a target base station is less than a downlink coherence time. When the relative delay is less than the downlink coherence time, the soft handoff is performed.

21 Claims, 5 Drawing Sheets

METHOD AND SYSTEM FOR PERFORMING A SOFT HANDOFF IN AN OFDMA WIRELESS NETWORK

TECHNICAL FIELD OF THE INVENTION

The present invention relates generally to wireless networks and, more specifically, to a method and system for performing a soft handoff in an Orthogonal Frequency-Division Multiple Access (OFDMA) wireless network.

BACKGROUND OF THE INVENTION

Wireless communication networks typically divide a radio network into cells, and a mobile station in a particular cell is provided with service from a base station in that cell. When the mobile station travels from one cell to another cell, a handoff of the mobile station from the first base station to a second base station is performed to ensure continuous service for the mobile station. A handoff transfers control of the mobile station to the second base station.

Handoffs are generally divided into soft handoffs and hard handoffs. For a soft handoff, service is concurrently provided by the first base station and the second base station, after which service by the first base station is disconnected. For a hard handoff, service provided by the first base station is disconnected before service begins to be provided by the second base station. Thus, soft handoffs may be preferred to ensure that calls are not inadvertently dropped. However, some systems, such as Orthogonal Frequency-Division Multiple Access (OFDMA) systems, fail to provide a mechanism for accomplishing soft handoffs.

Therefore, there is a need in the art for improved OFDMA networks that allow a soft handoff of a mobile station from one base station to another. In particular, there is a need for an OFDMA network that is able to provide communication on a downlink from each of two base stations to one mobile station and/or on an uplink from one mobile station to each of the two base stations in order to allow the performance of a soft handoff of the mobile station.

SUMMARY OF THE INVENTION

In accordance with the present invention, a method and system for performing a soft handoff in an OFDMA wireless network are provided that substantially eliminate or reduce disadvantages and problems associated with conventional methods and systems.

To address the above-discussed deficiencies of the prior art, it is a primary object of the present invention to provide a method for performing a soft handoff in an OFDMA wireless network. According to an advantageous embodiment of the present invention, the method includes determining whether a relative delay between receipt of a source pilot signal from a source base station and receipt of a target pilot signal from a target base station is less than a downlink coherence time. When the relative delay is less than the downlink coherence time, the soft handoff is performed.

According to one embodiment of the present invention, the method includes receiving the source pilot signal and the target pilot signal. The determination is made regarding whether the relative delay between receipt of the source pilot signal and receipt of the target pilot signal is less than the downlink coherence time by monitoring the relative delay.

According to another embodiment of the present invention, the downlink coherence time is based on a cyclic prefix for the mobile station.

According to still another embodiment of the present invention, the downlink coherence time is equal to the cyclic prefix.

According to yet another embodiment of the present invention, the soft handoff is performed by combining source sub-channels received from the source base station with target sub-channels received from the target base station to generate combined sub-channels.

According to a further embodiment of the present invention, the soft handoff is also performed by extracting from the combined sub-channels a source signal for the mobile station from the source base station and a target signal for the mobile station from the target base station.

According to a still further embodiment of the present invention, the source signal and the target signal are extracted by performing a Fast Fourier Transform on the combined sub-channels.

According to yet a further embodiment of the present invention, the soft handoff is also performed by adding the extracted source signal to the extracted target signal to generate a single soft handoff signal.

According to an even further embodiment of the present invention, the soft handoff is also performed by processing the soft handoff signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged Orthogonal Frequency-Division Multiple Access (OFDMA) wireless network.

Figure 1:
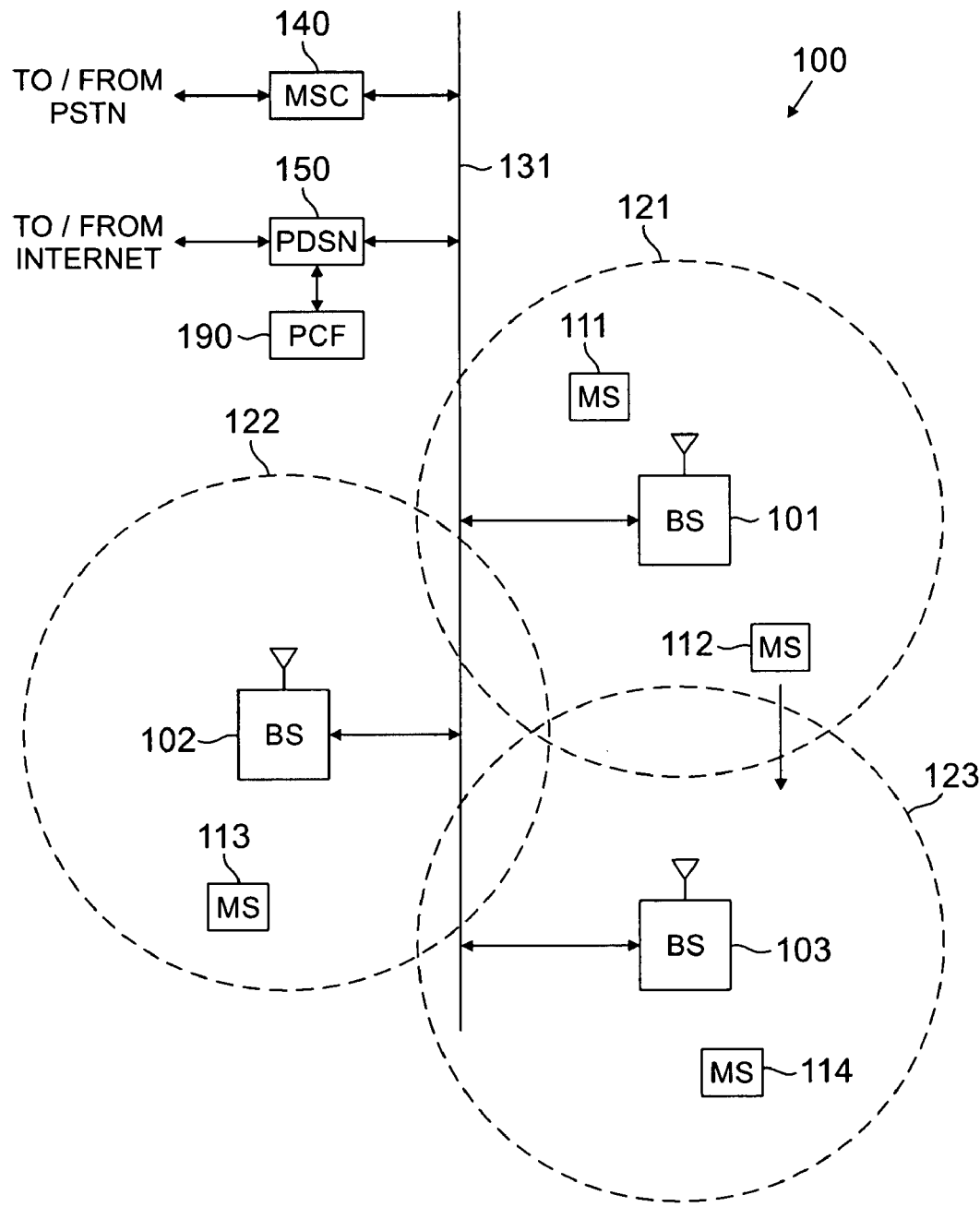
FIG. 1 illustrates an exemplary Orthogonal Frequency-Division Multiple Access (OFDMA) wireless network that is capable of allowing soft handoffs according to the principles of the present invention.

FIG. 1 illustrates an exemplary OFDMA wireless network 100 that is capable of allowing soft handoffs according to the principles of the present invention. In one embodiment, OFDMA wireless network 100 operates in accordance with an IEEE 802.11, an IEEE 802.16, an IEEE 802.20 and/or a third generation partnership project (3GPP) long-term evolution standard. OFDMA wireless network 100 comprises a plurality of cell sites 121-123, each containing one of the base stations, BS 101, BS 102, or BS 103. Base stations 101-103 communicate with a plurality of mobile stations (MS) 111-114 over OFDMA channels. In an advantageous embodiment of the present invention, mobile stations 111-114 are capable of receiving data traffic and/or voice traffic on two or more OFDMA channels simultaneously.

In OFDMA wireless network 100, each mobile station 111-114 is assigned a particular sub-channel by the base station 101-103 providing communication for that mobile station 111-114. The sub-channel is a block of frequencies that carries data destined for the mobile station 111-114. Thus, each sub-channel transmitted by a base station 101-103 carries different information from the other sub-channels. A particular mobile station 111-114 may be assigned more than one sub-channel in order to allow that mobile station 111-114 to receive data at a higher rate.

Each mobile station 111-114 processes essentially the entire band received from the corresponding base station 101-103 but uses only the information within the sub-channel that is assigned to that mobile station 111-114. In addition, for OFDMA communication, each mobile station 111-114 in a particular cell 121-123 is synchronized to the base station 101-103 for that cell 121-123 such that the mobile station 111-114 knows the amount of time its signals use to reach the base station 101-103. Thus, for the illustrated embodiment, mobile stations 111 and 112 are synchronized to base station 101, mobile station 113 is synchronized to base station 102, and mobile station 114 is synchronized to base station 103.

Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links. The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Mobile stations 111-114 comprise time division duplex (TDD) mobile stations. Thus, the base stations 101-103 and the mobile stations 111-114 are synchronized such that each base station 101-103 receives information from mobile stations 111-114 in its area during a set receive time and transmits information to those mobile stations 111-114 during a set transmit time, and each mobile station 111-114 similarly transmits during the receive time and receives during the transmit time.

In order to ensure that information is received at the base station 101-103 within the base station's 101-103 receive time, each mobile station 111-114 is able to determine how long information sent from that mobile station 111-114 will take to be received at the corresponding base station 101-103. Each mobile station 111-114 makes this determination based on ranging information received from the corresponding base station 101-103.

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary OFDMA wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a handoff will occur.

A handoff transfers control of a call from a first cell to a second cell. For example, if mobile station 112 is in communication with base station 101 and senses that the signal from base station 101 is becoming unacceptably weak, mobile station 112 may then switch to a base station that has a stronger signal, such as the signal transmitted by base station 103. Mobile station 112 and base station 103 establish a new communication link and a signal is sent to base station 101 and the public switched telephone network to transfer the on-going voice, data, or control signals through base station 103. The call is thereby seamlessly transferred from base station 101 to base station 103. An "idle" handoff is a handoff between cells of a mobile device that is communicating in the control or paging channel, rather than transmitting voice and/or data signals in the regular traffic channels.

In accordance with the principles of the present invention, a soft handoff of mobile station 112 may be provided between base station 101 and base station 103. Mobile station 112 may remain in soft handoff for an indefinite period of time, for example, when mobile station 112 is moving slowly or is stationary. This may be the case, for example, if mobile station 112 is a fixed wireless terminal. Thus, as used herein, an "indefinite period of time" comprises at least several minutes and may be up to several weeks or longer. As described in more detail below, a soft handoff may be performed on the downlink if signals transmitted from the two base stations 101 and 103 arrive at mobile station 112 within a defined downlink coherence time. Similarly, a soft handoff may be performed on the uplink if the difference between a transmission period for signals transmitted from mobile station 112 to base station 101 and a transmission period for signals transmitted to base station 103 is within a defined uplink coherence time. Coherence time may be defined as the difference in time from when the first multi-path component of the signal from the source base station arrives at mobile station 112 to the time when the last multi-path component of the signal from the target base station arrives at mobile station 112. Generally, one or both of these coherence time conditions will be satisfied when mobile station 112 is near the border of cells 121 and 123 because mobile station 112 will most likely be similar distances apart from each of base stations 101 and 103 in this area, resulting in the signals between mobile station 112 and base stations 101 and 103 taking close to the same amount of time to travel back and forth.

For one embodiment, the downlink coherence time is based on a cyclic prefix, or guard time, for mobile station 112. The cyclic prefix comprises an amount of time, also referred to as a guard time, allotted for mobile station 112 to receive information that may have been delayed in arriving at mobile station 112 due to scattering and/or other delaying conditions. For a particular embodiment, the downlink coherence time is equal to the cyclic prefix. Generally, it is preferable that the downlink coherence time be equal to or less than the cyclic prefix guard time, but in one embodiment the downlink coherence time may be somewhat greater than the cyclic prefix guard time.

For soft handoffs on the uplink, the time difference between multiple transmission periods to multiple base stations 101 and 103 is less than the uplink coherence time. For one embodiment, the uplink coherence time is based on a Transmit Receive Transition Gap (TRTG) for mobile station 112. For a particular embodiment, the uplink coherence time is equal to the TRTG. The TRTG is the time gap between the last sample of a downlink burst and the first sample of a subsequent uplink burst. The TRTG allows time for the base stations 101 and 103 to switch from transmit mode to receive mode. While generally it is preferable that soft handoffs be confined to circumstances where the time difference between multiple transmission periods to multiple base stations 101 and 103 is less than the TRTG, in an embodiment soft handoffs may be permitted when the time difference between multiple transmission periods to multiple base stations 101 and 103 is equal to or somewhat greater than the TRTG.

The difference in transmission periods is based on the TDD nature of mobile station 112. Mobile station 112 transmits information to each base station 101 and 103 using a delay or advance time period based on the distance between mobile station 112 and each base station 101 and 103 to ensure that each base station 101 and 103 receives the transmitted signal within the specified receive time for the base station 101 or 103 regardless of time differences in signal travel. Thus, the transmission period from mobile station 112 to base station 101 may be slightly different from the transmission period from mobile station 112 to base station 103.

Figure 2:
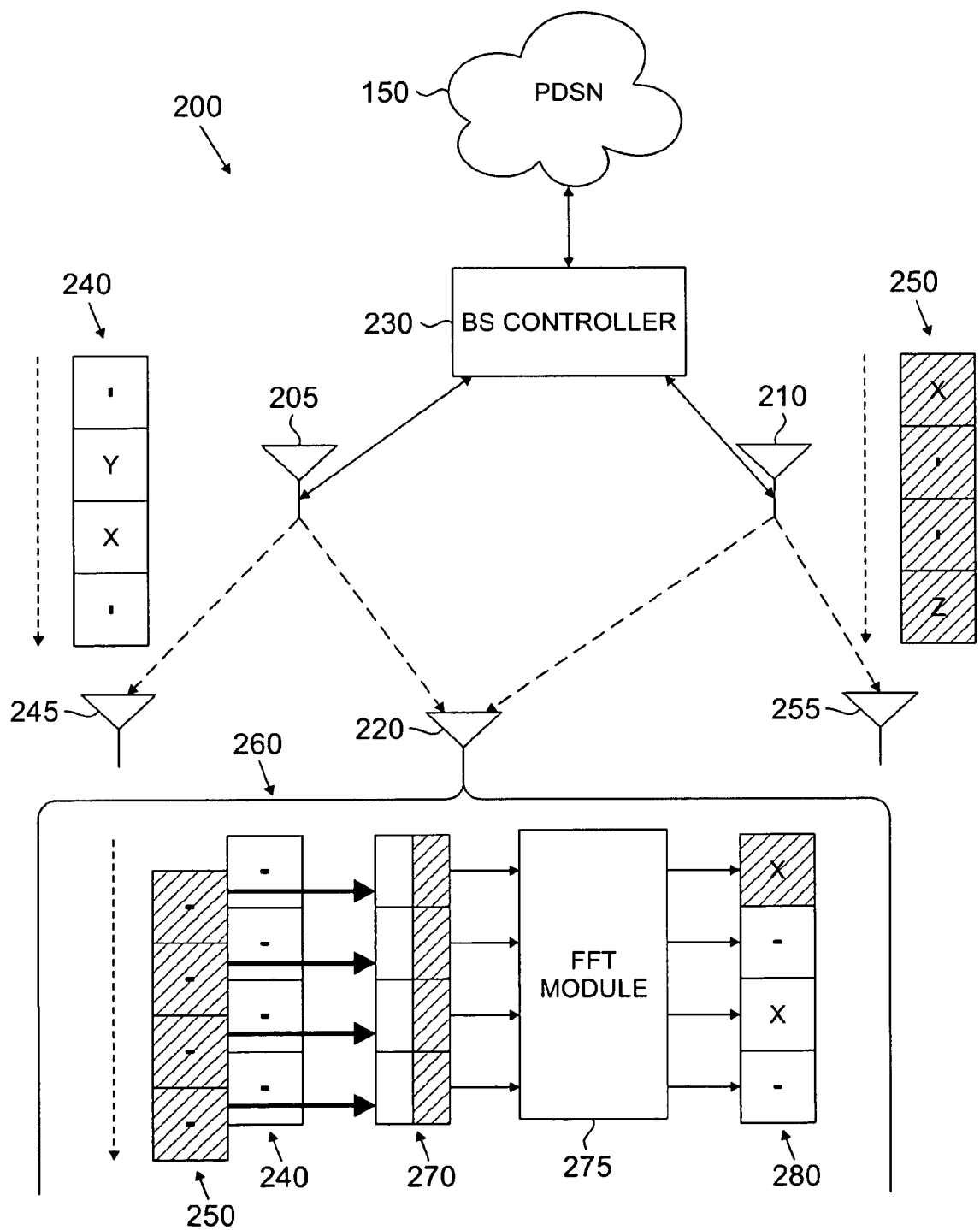
FIG. 2 illustrates a portion of the OFDMA wireless network of FIG. 1 providing communication on a downlink from each of two base stations to one mobile station to perform a soft handoff according to the principles of the present invention.

FIG. 2 illustrates a portion 200 of OFDMA wireless network 100 providing communication on a downlink from each of two base stations 205 and 210 to one mobile station 220 to perform a soft handoff according to the principles of the present invention. For the illustrated embodiment, mobile station 220 is originally communicating with source base station 205 and a soft handoff is being performed to target base station 210.

Base station (BS) controller 230 is operable to manage the resources for a particular area, including any base stations within that area, such as base station 205 and base station 210. According to one embodiment, BS controller 230 is operable to coordinate sub-channel assignments for these base stations so that a sub-channel used for soft handoff by a particular base station, such as base station 205, is not being used by a neighboring base station, such as base station 210.

Alternatively, soft handoff sub-channels may be reused for a base station that is adaptive antenna array (AAA) enabled, as long as the reused sub-channels are used on mobile stations that are physically separated from the mobile station in soft handoff. For a particular embodiment, BS controller 230 is operable to determine which sub-channels to use for soft handoff based on carrier-to-interference ratio channel quality measurements made by the mobile station and periodically fed back to the base station.

For the illustrated embodiment, source base station 205 is operable to send source sub-channels 240 to mobile stations in its coverage area, including mobile station 220 and mobile station 245. The second source sub-channel 240 received by mobile stations 220 and 245 comprises a sub-channel X, intended for mobile station 220, and the third source sub-channel 240 received by mobile stations 220 and 245 comprises a sub-channel Y, intended for mobile station 245. The first and fourth source sub-channels 240 comprise unassigned sub-channels.

Target base station 210 is operable to send target sub-channels 250 to mobile stations in its coverage area, including mobile station 220 and mobile station 255. The first target sub-channel 250 received by mobile stations 220 and 255 comprises a sub-channel Z, intended for mobile station 255, and the fourth target sub-channel 250 received by mobile stations 220 and 255 comprises a sub-channel X, intended for mobile station 220. The second and third target sub-channels 250 comprise unassigned sub-channels.

Although illustrated with four sub-channels 240 and 250, it will be understood that base stations 205 and 210 may transmit any suitable number of sub-channels 240 and 250 in accordance with the number of mobile stations supported by base stations 205 and 210.

When soft handoff is possible for mobile station 220 on the downlink, signal processing 260 within mobile station 220 is performed as illustrated in FIG. 2. As indicated by the overlapping areas, each source sub-channel 240 and each target sub-channel 250 have arrived at mobile station 220 within the downlink coherence time. Thus, mobile station 220 is able to combine the sub-channels 240 and 250 received from both base stations 205 and 210 to generate combined sub-channels 270.

After performing a Fast Fourier Transform (FFT) on the information in the combined sub-channels 270 with an FFT module 275, mobile station 220 is operable to generate modified sub-channels 280 based on the results. Thus, as illustrated, mobile station 220 is operable to extract the information from the combined sub-channels 270 that is intended for itself, as indicated by the two modified sub-channels 280 labeled X. Mobile station 220 is then operable to combine these two modified sub-channels 280, for example, using a maximum ratio combining technique that is known to those skilled in the art, in order to generate a stronger signal comprising the information identified by X than either of the signals received from source base station 205 and target base station 210.

In this way, mobile station 220 is able to receive communication from both base stations 205 and 210 in order to participate in a soft handoff procedure. Soft handoff may be considered to provide a kind of communication diversity. In addition, the stronger signal generated in this manner may be used in power load balancing for the base stations 205 and 210. For example, if a signal received at mobile station 220 from source base station 205 is weak, source base station 205 typically increases power for transmitting to mobile station 220. However, with mobile station 220 also receiving a signal from target base station 210, if source base station 205 is overloaded in terms of power, source base station 205 need not increase transmission power if mobile station 220 is able to obtain a strong enough signal by combining signals received from both base stations 205 and 210. Alternatively, the communication from base stations 205 and 210 may carry two unique data streams, thereby increasing the data transmission rate available to the mobile station 112. As described above, the communication diversity provided by soft handoff may be used to reduce the transmission power levels or to increase the data rate of the mobile station 112.

Figure 3:
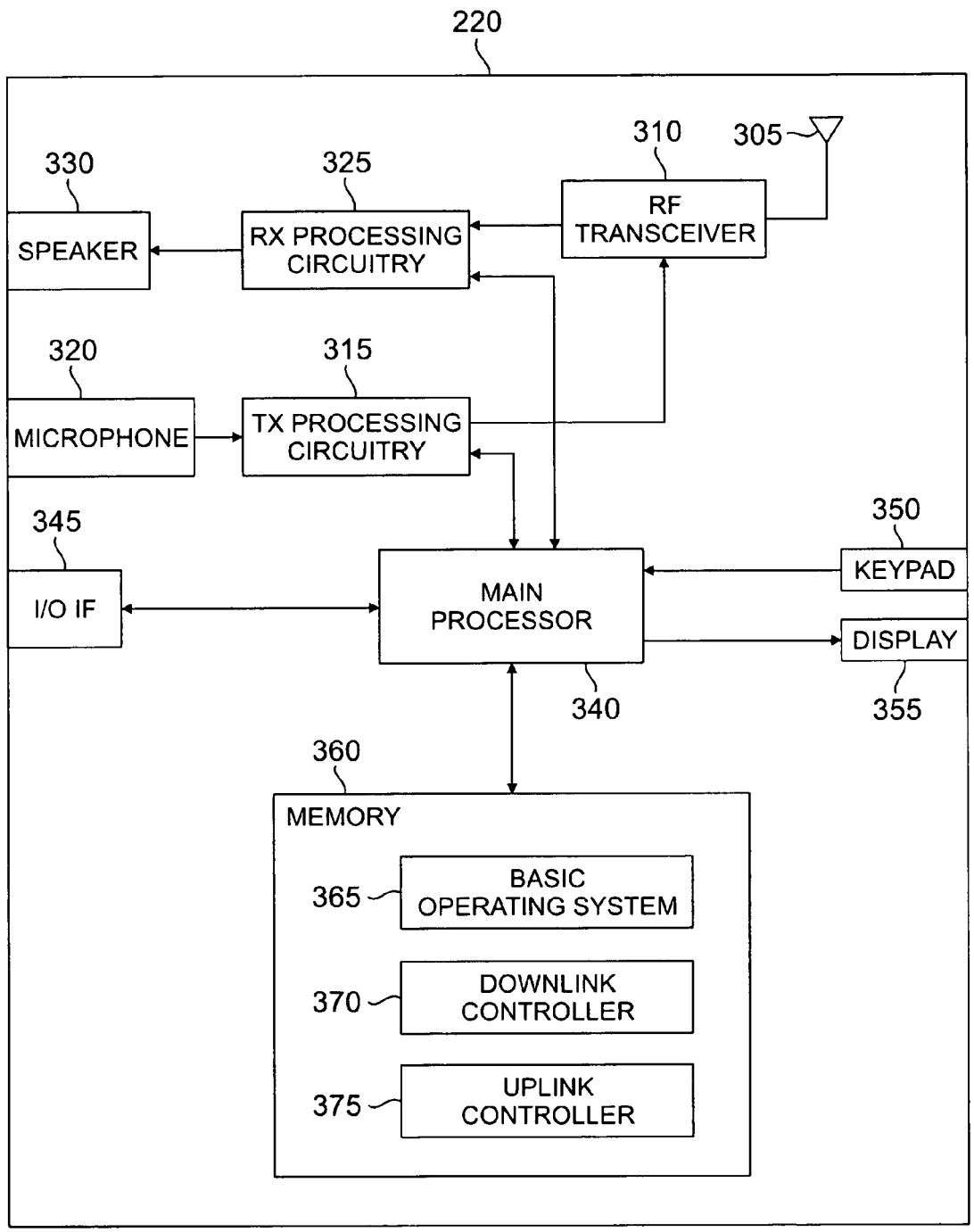
FIG. 3 illustrates an exemplary mobile station that is capable of performing a soft handoff according to the principles of the present invention.

FIG. 3 illustrates mobile station 220 in greater detail according to one embodiment of the present invention. Mobile station (MS) 220 is illustrated by way of example only. However, it will be understood that the components illustrated and described with respect to MS 220 are part of any mobile stations in OFDMA wireless network 100, including mobile stations 111-114, 245 and 255. MS 220 comprises antenna 305, radio frequency (RF) transceiver 310, transmit (TX) processing circuitry 315, microphone 320, receive (RX) processing circuitry 325, and speaker 330. MS 220 also comprises main processor 340, input/output (I/O) interface (IF) 345, keypad 350, display 355, and memory 360.

RF transceiver 310 receives from antenna 305 an incoming RF signal transmitted by BS 101. RF transceiver 310 down-converts the incoming RF signal to produce an intermediate frequency (IF) or a baseband signal. The IF or baseband signal may be sent to receiver processing circuitry 325, which produces a processed baseband signal by filtering, decoding, and/or digitizing the baseband or IF signal. Receiver processing circuitry 325 is also operable to transmit the processed baseband signal to speaker 330 (e.g., when the processed baseband signal comprises voice data) or to main processor 340 for further processing (e.g., when the processed baseband signal relates to web browsing).

Transmitter processing circuitry 315 receives analog or digital voice data from microphone 320 or other outgoing baseband data (e.g., web data, e-mail, interactive video game data and the like) from main processor 340. Transmitter processing circuitry 315 encodes, multiplexes and/or digitizes the outgoing baseband data to produce a processed baseband or IF signal. RF transceiver 310 receives the outgoing processed baseband or IF signal from transmitter processing circuitry 315. RF transceiver 310 up-converts the baseband or IF signal to an RF signal that may be transmitted via antenna 305.

According to one embodiment, main processor 340 may comprise a microprocessor or microcontroller. Memory 360, which is coupled to main processor 340, may comprise a random access memory (RAM) and/or a read-only memory (ROM). Main processor 340 executes basic operating system program 365 stored in memory 360 in order to control the overall operation of mobile station 220. In one such operation, main processor 340 controls the reception of forward channel signals and the transmission of reverse channel signals by RF transceiver 310, receiver processing circuitry 325, and transmitter processing circuitry 315. Main processor 340 may also execute other processes and programs resident in memory 360. Main processor 340 may move data into or out of memory 360, as required by an executing process.

Memory 360 further comprises a downlink controller 370 and an uplink controller 375. Although illustrated separately, it will be understood that downlink controller 370 and uplink controller 375 may be implemented together in a single application without departing from the scope of the present invention.

Downlink controller 370 is operable to monitor relative delays in received pilot signals from base stations, such as source base station 205 and target base station 210, in order to determine whether a soft handoff is possible between the two base stations on the downlink. If downlink controller 370 determines that the delays are within the downlink coherence time, downlink controller 370 is operable to combine received sub-channels, such as sub-channels 240 and 250, and to extract the signals for mobile station 220 from each sub-channel 240 and 250 assigned to mobile station 220. Downlink controller 370 is also operable to combine the two extracted signals, for example, using a maximum ratio combining technique known to those skilled in the art, to generate a stronger signal comprising the same information as the two separate signals.

Uplink controller 375 is operable to receive ranging information from each base station 205 and 210 in order to determine an appropriate delay or advance time period for signal transmissions to the base stations 205 and 210 such that each base station 205 and 210 will receive the transmission within the specified receive time. Based on the delay and/or advance time periods for each base station 205 and 210, uplink controller 375 is operable to determine whether the difference in the transmission periods to the multiple base stations 205 and 210 is less than the uplink coherence time. For a particular embodiment, the uplink coherence time comprises the Transmit Receive Transition Gap (TRTG). When the uplink coherence time condition is satisfied, uplink controller 375 is also operable to transmit signals to each base station 205 and 210 on the sub-channel assigned to mobile station 220 by each of the base stations 205 and 210 in order to support a soft handoff on the uplink.

Main processor 340 is also coupled to the I/O interface 345. I/O interface 345 provides mobile station 220 with the ability to connect to other devices, such as laptop computers, handheld computers and the like. I/O interface 345 provides a communication path between these accessories and main controller 340. Main processor 340 is also coupled to keypad 350 and display unit 355. The operator of mobile station 220 may use keypad 350 to enter data into mobile station 220. Display 355 may comprise a liquid crystal display capable of rendering text and/or graphics from websites. It will be understood that additional embodiments may use other types of displays.

Figure 4:
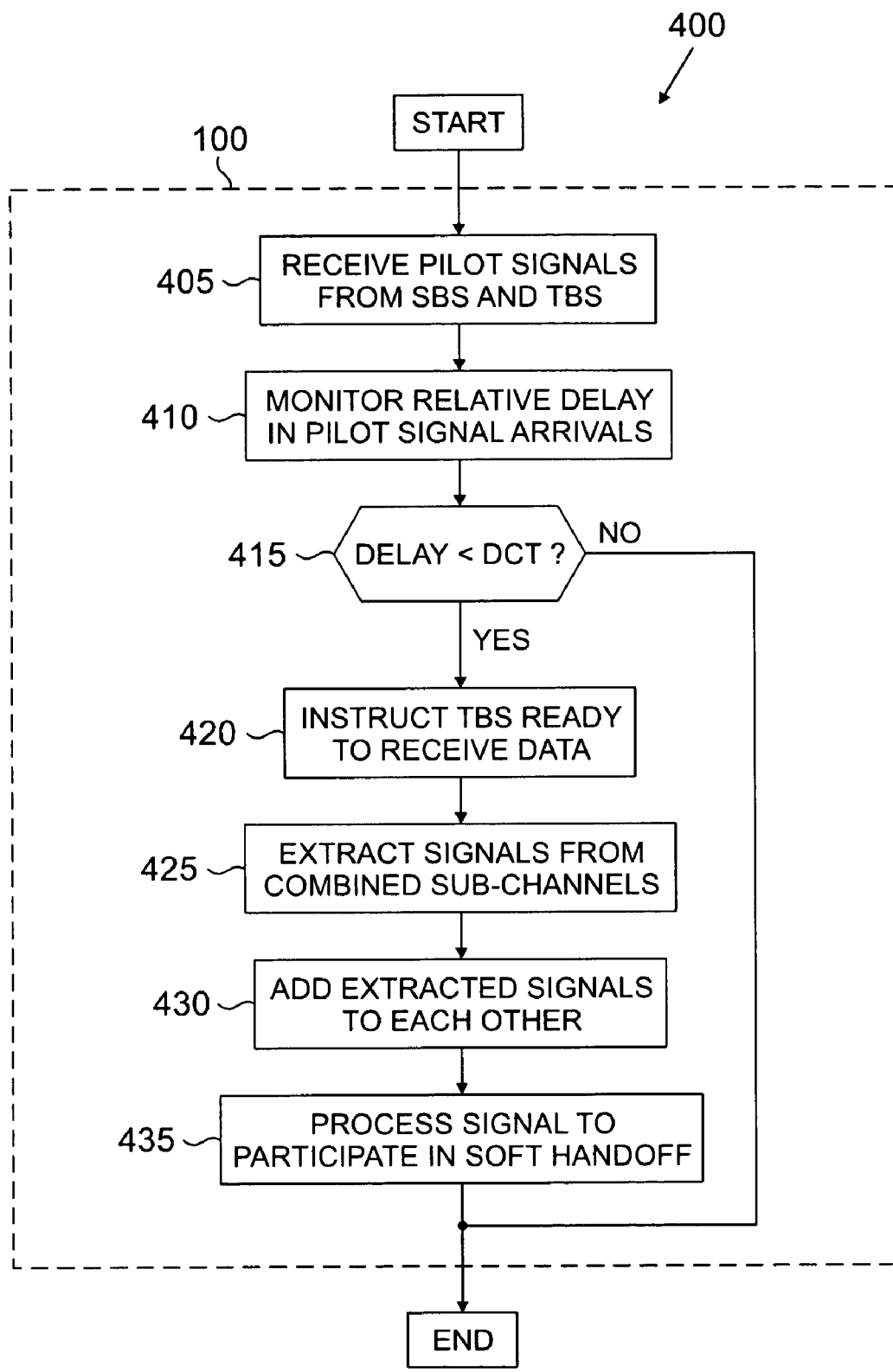
FIG. 4 is a flow diagram illustrating a method for performing a soft handoff in the OFDMA wireless network of FIG. 2 in the downlink direction according to the principles of the present invention.

FIG. 4 is a flow diagram illustrating a method 400 for performing a soft handoff in OFDMA wireless network 100 in the downlink direction according to the principles of the present invention. For the purposes of simplicity and clarity in explaining the operation of the present invention, it shall be assumed in the following example that base station 205 of OFDMA wireless network 100 is the source base station (SBS) for the soft handoff of mobile station (MS) 220 and base station 210 is the target base station (TBS). However, the description that follows also applies to any base stations and mobile stations in OFDMA wireless network 100.

Initially, mobile station 220 receives a pilot signal from source base station 205 and receives a pilot signal from target base station 210 (process step 405). Downlink controller 370 monitors the relative delay in the arrival of the two pilot signals at mobile station 220 (process step 410). If downlink controller 370 determines that the relative delay is equal to or greater than the downlink coherence time (DCT) (process step 415), the difference in distances between mobile station 220 and each of the two base stations 205 and 210 is too great for the soft handoff process to be performed on the downlink and the method comes to an end.

However, if downlink controller 370 determines that the relative delay is less than the downlink coherence time (process step 415), downlink controller 370 then instructs target base station 210 that it is ready to start receiving data in soft handoff mode (process step 420). Once target base station 210 starts to transmit data, mobile station 220 processes the combined received signals from base stations 205 and 210.

Downlink controller 370 extracts the signals provided by each base station 205 and 210 for mobile station 220 from the combined sub-channels 270 (process step 425). For example, downlink controller 370 may perform a Fast Fourier Transform on the combined sub-channels 270 in order to generate modified sub-channels 280 from which the signals may be extracted.

Downlink controller 370 then combines the extracted signals, for example, using a maximum ratio combining technique such as is known to those skilled in the art, to generate a single, stronger signal (process step 430). Finally, mobile station 220 processes the single signal in order to participate in the soft handoff process from source base station 205 to target base station 210 (process step 435).

Figure 5:
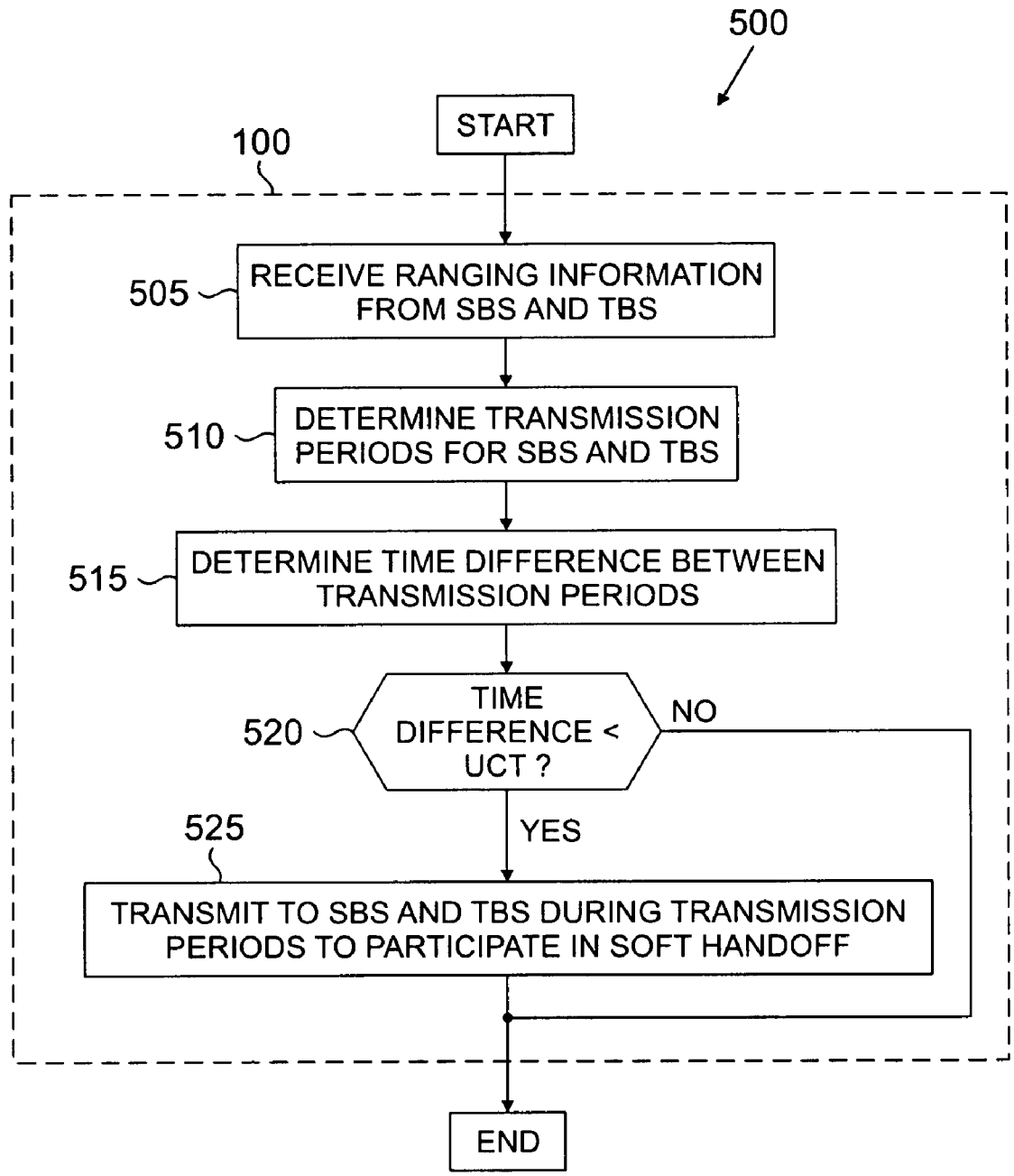
FIG. 5 is a flow diagram illustrating a method for performing a soft handoff in the OFDMA wireless network of FIG. 2 in the uplink direction according to the principles of the present invention.

FIG. 5 is a flow diagram illustrating a method 500 for performing a soft handoff in OFDMA wireless network 100 in the uplink direction according to the principles of the present invention. For the purposes of simplicity and clarity in explaining the operation of the present invention, it shall be assumed in the following example that base station 205 of OFDMA wireless network 100 is the source base station (SBS) for the soft handoff of mobile station (MS) 220 and base station 210 is the target base station (TBS). However, the description that follows also applies to any base stations and mobile stations in OFDMA wireless network 100.

Initially, mobile station 220 receives ranging information from both source base station 205 and target base station 210 (process step 505). Based on the ranging information for each base station 205 and 210, uplink controller 375 determines a transmission period for that base station 205 and 210 (process step 510). Uplink controller 375 then determines a time difference between the transmission periods for the two base stations 205 and 210 (process step 515).

If the time difference is equal to or greater than the uplink coherence time (UCT) (process step 520), the difference in distances between mobile station 220 and each of the two base stations 205 and 210 is too great for the soft handoff process to be performed on the uplink and the method comes to an end.

However, if the time difference is less than the uplink coherence time (process step 520), mobile station 220 transmits a signal that is received and processed by both source base station 205 and target base station 210 in order to participate in the soft handoff process from source base station 205 to target base station 210 (process step 525).

Although the present invention has been described with an exemplary embodiment, various changes and modifications may be suggested to one skilled in the art. It is intended that the present invention encompass such changes and modifications as fall within the scope of the appended claims.

What is claimed is:

1. For use in an Orthogonal Frequency-Division Multiple Access (OFDMA) wireless network capable of communicating with a plurality of mobile stations in a coverage area of the OFDMA wireless network, a method of performing a soft handoff for one of the mobile stations from a source base station to a target base station, the method comprising:
    determining a source transmission period for transmitting to the source base station;
    determining a target transmission period for transmitting to the target base station;
    determining whether a time difference between the source transmission period and the target transmission period is less than a Transmit Receive Transition Gap for the mobile station, wherein the Transmit Receive Transition Gap is a time gap between a last sample of a downlink burst and a first sample of a subsequent uplink burst; and when the time difference is less than the Transmit Receive Transition Gap, performing the soft handoff.

2. The method as set forth in claim 1, further comprising: determining the time difference between the source transmission period and the target transmission period.

3. The method as set forth in claim 1, performing the soft handoff comprising combining source sub-channels received from the source base station with target sub-channels received from the target base station to generate combined sub-channels.

4. The method as set forth in claim 3, performing the soft handoff further comprising performing a Fast Fourier Transform (FFT) on the combined sub-channels.

5. The method as set forth in claim 4, wherein the FFT is performed by a FFT module in the mobile station.

6. The method as set forth in claim 3, performing the soft handoff further comprising extracting from the combined sub-channels a source signal for the mobile station from the source base station and a target signal for the mobile station from the target base station.

7. The method as set forth in claim 6, performing the soft handoff further comprising combining the source signal for the mobile station and the target signal for the mobile station, wherein the combining employs a maximum ratio combining technique.

8. The method as set forth in claim 6, performing the soft handoff further comprising adding the extracted source signal to the extracted target signal to generate a single soft handoff signal.

9. The method as set forth in claim 8, performing the soft handoff further comprising processing the soft handoff signal.

10. For use in an Orthogonal Frequency-Division Multiple Access (OFDMA) wireless network capable of communicating with a plurality of mobile stations in a coverage area of the OFDMA wireless network, a method of performing a soft handoff for one of the mobile stations from a source base station to a target base station, the method comprising:

determining whether a time difference between a source transmission period for transmitting to the source base station and a target transmission period for transmitting to the target base station is less than a Transmit Receive Transition Gap for the mobile station, wherein the Transmit Receive Transition Gap is a time gap between a last sample of a downlink burst and a first sample of a subsequent uplink burst; and when the time difference is less than the Transmit Receive Transition Gap, performing the soft handoff.

11. The method as set forth in claim 10, further comprising:
receiving source ranging information from the source base station;
receiving target ranging information from the target base station;
determining the source transmission period based on the source ranging information; and
determining the target transmission period based on the target ranging information.

12. The method as set forth in claim 11, further comprising determining the time difference between the source transmission period and the target transmission period.

13. The method as set forth in claim 10, performing the soft handoff comprising combining source sub-channels received from the source base station with target sub-channels received from the target base station to generate combined sub-channels.

14. The method as set forth in claim 10, wherein the mobile station is stationary and the soft handoff is performed for at least several weeks.

15. The method as set forth in claim 10, performing the soft handoff comprising transmitting soft handoff information to the source base station during the source transmission period and transmitting the soft handoff information to the target base station during the target transmission period.

16. For use in an Orthogonal Frequency-Division Multiple Access (OFDMA) wireless network capable of communicating with a plurality of mobile stations in a coverage area of the OFDMA wireless network, a mobile station capable of participating in a soft handoff from a source base station to a target base station, the mobile station comprising:

a downlink controller operable to determine whether a relative delay between receipt of a source pilot signal from the source base station and receipt of a target pilot signal from the target base station is less than a cyclic prefix for the mobile station and, when the relative delay is less than the cyclic prefix, to perform the soft handoff; and an uplink controller operable to determine whether a time difference between a source transmission period for transmitting to the source base station and a target transmission period for transmitting to the target base station is less than a Transmit Receive Transition Gap for the mobile station and, when the time difference is less than the Transmit Receive Transition Gap, to perform the soft handoff, wherein the Transmit Receive Transition Gap is a time gap between a last sample of a downlink burst and a first sample of a subsequent uplink burst.

17. The mobile station as set forth in claim 16, the downlink controller operable to perform the soft handoff by (i) combining source sub-channels received from the source base station with target sub-channels received from the target base station to generate combined sub-channels, (ii) extracting from the combined sub-channels a source signal for the mobile station from the source base station and a target signal for the mobile station from the target base station, (iii) adding the extracted source signal to the extracted target signal to generate a single soft handoff signal, and (iv) processing the soft handoff signal.

18. The mobile station as set forth in claim 16, the uplink controller operable to perform the soft handoff by transmitting soft handoff information to the source base station during the source transmission period and transmitting the soft handoff information to the target base station during the target transmission period.

19. The mobile station as set forth in claim 16, the uplink controller further operable to (i) receive source ranging information from the source base station, (ii) receive target ranging information from the target base station, (iii) determine the source transmission period based on the source ranging information, (iv) determine the target transmission period based on the target ranging information, and (v) determine the time difference between the source transmission period and the target transmission period.

20. The mobile station as set forth in claim 16, the mobile station further comprising a memory, the memory comprising the downlink controller and the uplink controller.

21. The mobile station as set forth in claim 16, wherein the mobile station is operable to participate in the soft handoff for an indefinite period of time, whereby the mobile station supports one of either a higher data rate or a lower transmission power from the source base station and the target base station.

* * * * *